(12) United States Patent  
Cantin et al.

(10) Patent No.: US 8,919,663 B2  
(45) Date of Patent: Dec. 30, 2014

(54) SPREADER ASSEMBLY FOR VEHICLES AND METHOD FOR SPREADING GRANULAR MATERIALS

(75) Inventors: Hugues Cantin, Québec (CA); Guy Deschenes, Québec (CA)

(73) Assignee: Service D'Equipement G.D. Inc., Quebec (CA)

( * ) Notice: Subject to any disclaimer, the term of this patent is extended or adjusted under 35 U.S.C. 154(b) by 502 days.

(21) Appl. No.: 13/300,005

(22) Filed: Nov. 18, 2011

(65) Prior Publication Data

US 2012/0126023 A1    May 24, 2012

Related U.S. Application Data

(60) Provisional application No. 61/415,057, filed on Nov. 18, 2010.

(51) Int. Cl.
*A01C 7/06* (2006.01)
*B05B 17/00* (2006.01)

(52) U.S. Cl.
USPC ............. 239/7; 239/1; 239/656; 239/661; 239/667; 239/673; 239/682; 239/687

(58) Field of Classification Search
USPC ......... 239/650, 656, 661, 667, 668, 672, 673, 239/682, 687, 1, 7
See application file for complete search history.

(56) References Cited

U.S. PATENT DOCUMENTS

| | | | |
|---|---|---|---|
| 2,738,196 A | 3/1956 | Underwood | |
| 3,236,527 A * | 2/1966 | Suyder | 239/656 |
| 3,377,030 A | 4/1968 | Swenson | |
| 3,498,486 A | 3/1970 | Freeman, Jr. | |
| 4,162,766 A * | 7/1979 | Ten Broeck et al. | 239/656 |
| 4,405,089 A | 9/1983 | Taylor | |
| 5,273,211 A | 12/1993 | Pierce et al. | |
| 5,950,933 A | 9/1999 | Balmer | |
| 6,817,551 B2 | 11/2004 | Williams et al. | |
| 7,380,733 B2 * | 6/2008 | Owenby et al. | 239/656 |
| 2007/0034721 A1 | 2/2007 | Owenby et al. | |
| 2008/0156907 A1 | 7/2008 | Tremblay et al. | |

* cited by examiner

*Primary Examiner* — Steven J Ganey
(74) *Attorney, Agent, or Firm* — Price Heneveld LLP

(57) ABSTRACT

A spreader assembly comprising: a frame having a longitudinal axis; at least two bins mounted to the frame, two of the at least two bins being disposed sequentially along the longitudinal axis and each including a movement imparting assembly oriented substantially parallel to the longitudinal axis of the frame and being configured to advance material lengthwise in opposed directions toward adjacent ends of the two bins; and at least one discharge movement imparting assembly mounted to the frame, oriented substantially perpendicularly to the longitudinal axis of the frame and being configured to receive material conveyed by at least one of the two bin movement imparting assemblies and advance the material towards a lateral end of the frame.

26 Claims, 5 Drawing Sheets

Detail A

SPREADER ASSEMBLY FOR VEHICLES AND METHOD FOR SPREADING GRANULAR MATERIALS

CROSS-REFERENCE TO RELATED APPLICATIONS

This application claims priority under 35 USC§119(e) of U.S. provisional patent application 61/415,057 filed on Nov. 18, 2010, the specification of which is hereby incorporated by reference.

TECHNICAL FIELD OF THE INVENTION

The technical field relates to equipment for hauling and spreading granular or particular materials and to an associated method. It also relates to a spreader assembly having multiple bins or hoppers for carrying and spreading granular or particular materials such as salt and sand.

BACKGROUND

Spreader systems for hauling and spreading granular materials are well-known. For instance and without being limitative, these spreader systems are used for spreading salt and sand on roads in order to melt snow and ice during winter. Trucks for spreading sand and salt usually have a frame or haul a trailer including one or several bins or hoppers mounted thereon. The particular materials are conveyed outwardly of the bins or hoppers through one or several conveyors. The discharge chute of the spreader is typically positioned at the rear or the front of the respective bin.

Due to variable road or ground conditions, the ratio of granular materials spread must often be varied along the vehicle run. There is thus a need for a spreader assembly which can convey and spread more than one granular material and which can provide variable mixtures of granular materials.

SUMMARY OF THE INVENTION

It is therefore an aim of the present invention to address the above mentioned issues.

According to a general aspect, there is provided a spreader assembly comprising: a frame having a longitudinal axis; at least two bins mounted to the frame, two of the at least two bins being disposed sequentially along the longitudinal axis and each including a movement imparting assembly oriented substantially parallel to the longitudinal axis of the frame and being configured to advance materials lengthwise in opposed directions toward adjacent ends of the two bins; and at least one discharge movement imparting assembly mounted to the frame, oriented substantially perpendicularly to the longitudinal axis of the frame and being configured to receive materials conveyed by at least one of the two bin movement imparting assemblies and advance the materials towards a lateral end of the frame.

According to another general aspect, there is provided a mobile trailer comprising a frame and a spreader assembly mounted thereto, the spreader assembly comprising: at least two bins mounted to the frame, two of the at least two bins being disposed sequentially along the longitudinal axis and each including a bin conveyor oriented substantially parallel to a longitudinal axis of the frame and being configured to advance lengthwise in opposed directions toward adjacent ends of the two bins; and at least one discharge conveyor mounted to the frame, oriented substantially perpendicularly to the longitudinal axis of the frame and being configured to receive material conveyed by at least one of the two bin conveyors and advance the material towards a lateral end of the frame.

According to still another general aspect, there is provided a self-propelled vehicle comprising: a frame having a longitudinal axis; at least two hoppers mounted to the frame and disposed sequentially along the longitudinal axis, each one of the at least two hoppers including a hopper conveyor oriented substantially parallel to the longitudinal axis of the frame and being configured to advance lengthwise in opposed directions toward adjacent ends of the hoppers; and a discharge conveyor mounted to the frame, oriented substantially perpendicularly to the longitudinal axis of the frame and located at the junction of the two hopper conveyors and being configured to receive materials from the hopper conveyors and to laterally convey the materials.

According to a further general aspect, there is provided a method for spreading materials from a spreader assembly mounted to a frame and including two bins disposed sequentially along a longitudinal axis of the frame, the method comprising: conveying rearwardly material contained in a front one of the bins; conveying forwardly material contained in a rear one of the bins; receiving the materials conveyed forwardly and rearwardly from the front one and the rear one of the bins; conveying laterally the materials received; and discharging the materials conveyed laterally.

According to a general aspect, there is provided a spreader assembly comprising: a frame with a longitudinal axis; at least two bins mounted to the frame, two of the at least two bins being disposed sequentially along the longitudinal axis and each including a bin movement imparting assembly, the movement imparting assemblies of the two bins being configured to advance materials longitudinally and in opposed directions toward adjacent ends of the two bins; and at least one discharge movement imparting assembly mounted to the frame and configured to receive the materials conveyed by at least one of the two bin movement imparting assemblies and advance laterally the materials.

The spreader assembly can be mounted to a self-propelled vehicle.

In an embodiment, the bin movement imparting assemblies are oriented substantially parallel to the longitudinal axis of the frame and the discharge movement imparting assembly is oriented substantially perpendicularly to the longitudinal axis of the frame.

In an embodiment, the bins comprise funnel-shaped hoppers and the bin movement imparting assemblies are mounted to a bottom portion of the funnel-shaped hoppers.

In an embodiment, the bins are mounted in an end-to-end relationship with a rear end of a front bin being adjacent to a front end of a rear bin.

In an embodiment, the bin movement-imparting assemblies comprise bin conveyors and the discharge movement imparting assembly comprises a discharge conveyor configured to receive the materials from the bin conveyors configured to advance materials longitudinally in opposed directions. The discharge conveyor is located between and below adjacent ends of the bin conveyors.

In an embodiment, the frame comprises at least one rear wheel; and the discharge movement imparting assembly is mounted forwardly to the rear wheel and comprises a discharge end substantially aligned laterally with the rear wheel (s). A portion of the materials discharged by the discharge movement imparting assembly is pressed onto ground by the rear wheel(s) aligned laterally with the discharge end.

In an embodiment, the bins comprise a discharge opening through which a respective one of the bin movement imparting assemblies extends and the materials contained in the at least one of the bins are conveyed.

In a particular embodiment, the spreader assembly comprises two bins disposed sequentially along the longitudinal axis and each one has a bin movement imparting assembly, such as a bin conveyor. The movement imparting assemblies are configured to advance materials longitudinally and in opposed directions toward adjacent ends of the two bins. The spreader assembly further comprises a discharge movement imparting assembly, such as a discharge conveyor, mounted to the frame and configured to receive the materials conveyed by the bin movement imparting assemblies and advance laterally the materials.

According to another general aspect, there is provided a mobile trailer comprising a frame with a longitudinal axis and a spreader assembly mounted thereto. The spreader assembly comprising: at least two bins mounted to the frame, disposed sequentially along the longitudinal axis and including a bin movement imparting assembly oriented substantially parallel to the longitudinal axis, the bin movement imparting assemblies of at least two of the sequentially disposed bins being configured to advance material contained in their respective bins longitudinally in opposed directions; and at least one discharge movement imparting assembly mounted to the frame, oriented substantially perpendicularly to the longitudinal axis and being configured to receive material conveyed by at least one of the two bin movement imparting assemblies and advance the material laterally.

The frame can be securable to a vehicle for being hauled thereby.

In an embodiment, the bin movement imparting assemblies are mounted to a bottom portion of the bins and advance materials towards proximal ends of the two bins.

In an embodiment, the frame comprises at least one rear wheel; and the discharge movement imparting assembly is mounted forwardly to the rear wheel and comprises a discharge end substantially aligned laterally with the rear wheel and a portion of the materials discharged is pressed onto ground by the rear wheel aligned laterally with the discharge end.

In an embodiment, the bin movement imparting assemblies comprises a bin conveyor and the discharge movement imparting assembly comprises a discharge conveyor and the discharge conveyor is configured to receive the materials from the bin movement imparting assemblies configured to advance the material contained in the bins longitudinally in opposed directions. The discharge conveyor is located between and below proximal ends of the bin movement imparting assemblies configured to advance the material contained in the bins longitudinally in opposed directions.

In an embodiment, the bins comprise a discharge opening through which a respective one of the bin movement imparting assemblies extends and the materials contained in the bins exit.

In a particular embodiment, the spreader assembly comprises two bins mounted to the frame and disposed sequentially along the longitudinal axis. Each one of the bins includes a bin movement imparting assembly, such as a bin conveyor, oriented substantially parallel to the longitudinal axis. The bin movement imparting assemblies are configured to advance material contained in their respective bins longitudinally in opposed directions. The spreader assembly further includes a discharge movement imparting assembly, such as a discharge conveyor, mounted to the frame and oriented substantially perpendicularly to the longitudinal axis. The discharge conveyor is configured to receive material conveyed by the two bin movement imparting assemblies and advance the material laterally.

According to a further general aspect, there is provided a self-propelled vehicle comprising: a frame having a longitudinal axis; at least two bins mounted to the frame and disposed sequentially along the longitudinal axis, at least two of the sequentially disposed bins including a bin conveyor oriented substantially parallel to the longitudinal axis of the frame, the bin conveyors being configured to advance materials lengthwise in opposed directions toward proximal ends of the bins; and a discharge conveyor mounted to the frame, oriented substantially perpendicularly to the longitudinal axis of the frame and located close to adjacent ends of the two bin conveyors and being configured to receive materials from the bin conveyors and to laterally convey the materials.

In an embodiment, the bins have contiguous end walls and the bin conveyors are mounted to a bottom portion of the bins.

In an embodiment, the discharge conveyor is located between and below the adjacent ends of the two bin conveyors.

In an embodiment, the frame comprises at least one rear wheel and the discharge conveyor is mounted forwardly to the rear wheel(s) and comprises a discharge end substantially aligned laterally with the rear wheel(s) and a portion of the materials discharged is pressed onto ground by the rear wheel(s).

In an embodiment, the bins comprise a discharge opening through which a respective one of the bin conveyor extends and the materials contained in the bins are conveyed.

In a particular embodiment, the self-propelled vehicle comprises two bins mounted to the frame and disposed sequentially along the longitudinal axis. Each one of the bins includes a bin conveyor oriented substantially parallel to the longitudinal axis of the frame. The bin conveyors are configured to advance materials lengthwise in opposed directions toward proximal ends of the bins. The self-propelled vehicle further comprises a discharge conveyor mounted to the frame, oriented substantially perpendicularly to the longitudinal axis of the frame and located close to adjacent ends of the bin conveyors. The discharge conveyor is configured to receive materials from the bin conveyors and to laterally convey the materials.

According to still another general aspect, there is provided a method for spreading materials from a spreader assembly mounted to a frame and including two bins disposed sequentially along a longitudinal axis of the frame. The method comprises: conveying rearwardly material contained in a front one of the bins; conveying forwardly material contained in a rear one of the bins; receiving the materials conveyed forwardly and rearwardly from the front one and the rear one of the bins; conveying laterally the materials received; and discharging the materials conveyed laterally.

In an embodiment, the material contained in the front one of the bins is conveyed rearwardly on a front bin conveyor and the material contained in the rear one of the bins are conveyed forwardly on a rear bin conveyor.

In an embodiment, the materials are received on a discharge conveyor.

In an embodiment, the materials are discharged at a lateral end of the spreader assembly and forwardly of at least one rear wheel mounted to the frame.

BRIEF DESCRIPTION OF THE DRAWINGS

FIG. 4 is a sectional view along section lines 4-4 of FIG. 2; and.

It will be noted that throughout the appended drawings, like features are identified by like reference numerals.

DETAILED DESCRIPTION OF THE PREFERRED EMBODIMENT

Figure 1:
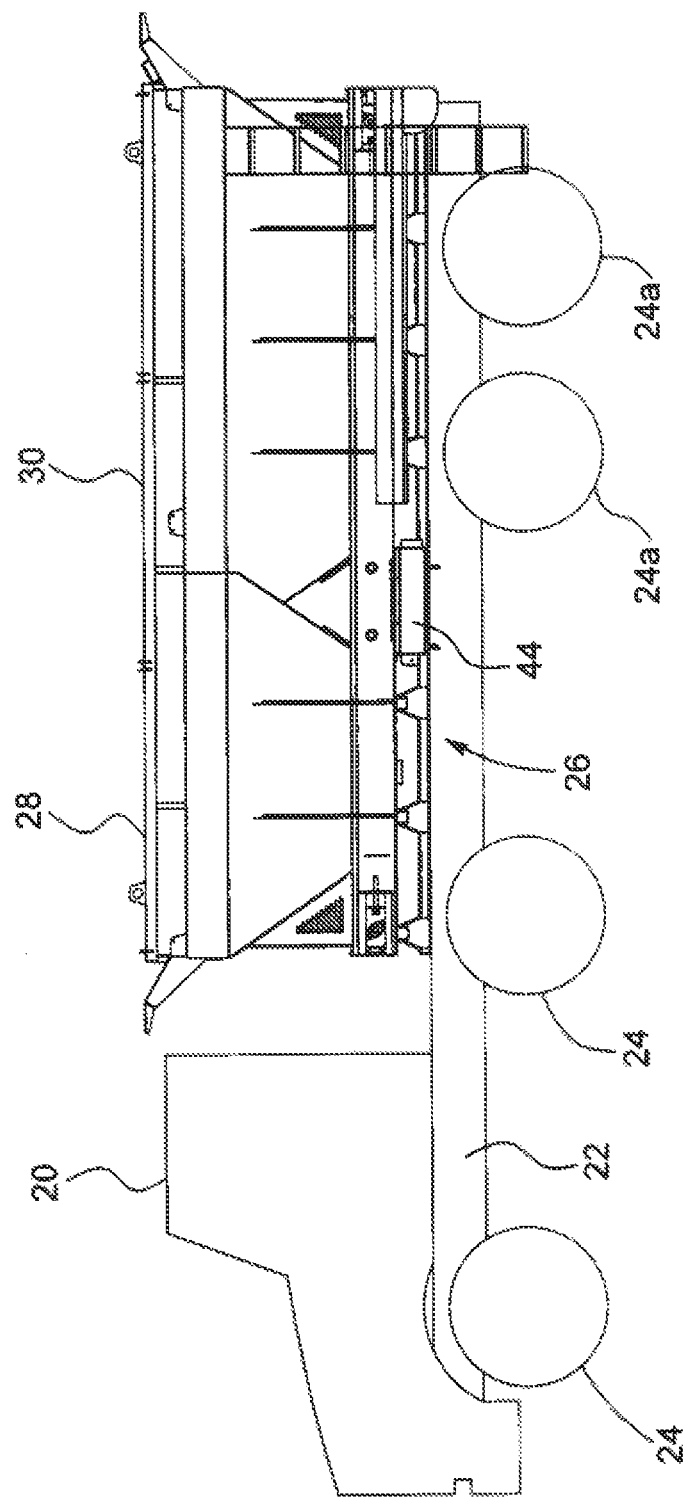
FIG. 1 is a side elevation view of a self-propelled vehicle carrying a spreader assembly in accordance with an embodiment.
Figure 4:
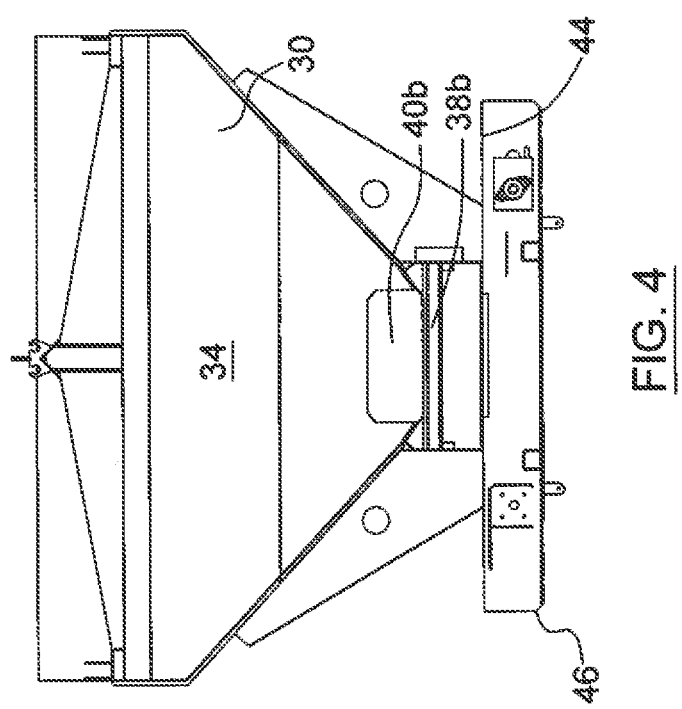

For purposes of description herein, the terms "upper," "lower," "right," "left," "rear," "front," "vertical," "horizontal," and derivatives thereof shall relate to the invention as oriented in FIGS. 1 and 4. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

Referring to FIG. 1, there is shown a wheeled and self-propelled vehicle 20 and, more particularly a truck, having a frame 22 with a longitudinal axis 23 (FIG. 3), a plurality of pairs of wheels 24, 24a mounted to and along the frame 22, and a spreader assembly 26 mounted to the frame 22. The longitudinal axis 23 of the frame 22 extends between a front end of the frame 22 towards an opposed rear end of the frame 22.

In the embodiment shown, the spreader assembly 26 includes a front hopper or bin 28, close to the front end of the frame 22, and a rear hopper or bin 30, close to the rear end of the frame 22, and a conveying and dispensing system as it will be described in more detail below.

In the description, the term "front" is associated with features mounted or provided forwardly of a discharge movement imparting assembly 44, as it will be described in more details below. Similarly, the term "rear" is associated with features mounted or provided rearwardly of the discharge movement imparting assembly 44. For instance, the front wheels 24 are mounted to the frame 22 forwardly of the discharge movement imparting assembly 44 while the rear wheels 24a are mounted to the frame 22 rearwardly of the discharge movement imparting assembly 44.

The hoppers 28, 30 are adapted to contain granular or particulate materials such as salt, sand, fertilizer, and the like. Each one of the hoppers 28, can contain a different granular material. For instance and without being limitative, the front hopper 28 can contain salt while the rear hopper 30 can contain sand. Therefore, one spreader assembly 26 can spread more than one granular material and variable ratios of the granular materials.

Figure 2:
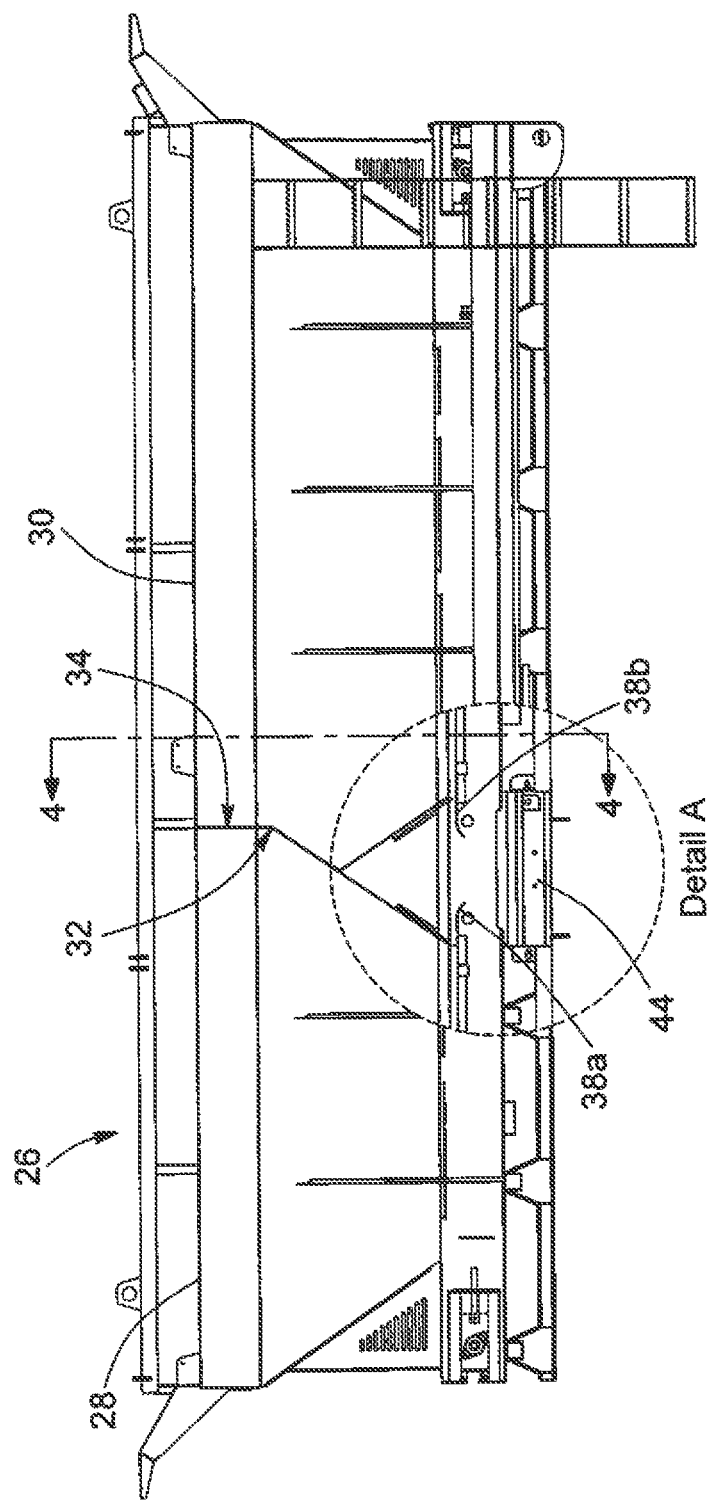
FIG. 2 is a side elevation view of the spreader assembly shown in FIG. 1, wherein detail A is a cross-sectional view of a portion of the spreader assembly.

Referring now to FIG. 2, there is shown that the hoppers 28, 30 are mounted in end wall adjacent (or end-to-end) relationship with a rear end wall 32 of the front hopper 28 being adjacent to the front end wall 34 of the rear hopper 30. Each one of the hoppers 28, 30 also has side walls 36 extending substantially parallel to the longitudinal axis 23 of the frame 22. In the embodiment shown, the end walls 32, 34 and the side walls 36 have an upright upper section and a sloped lower section to define funnel shaped hoppers. One skilled in the art will appreciate that in the embodiment shown, the end walls 32, 34 of the two adjacent hoppers are contiguous, however, in an alternative embodiment (not shown), the adjacent hoppers 28, 30 can be spaced-apart from one another.

One skilled in the art will appreciate that the shape of the hoppers or the bins can differ from the one shown. In an alternative embodiment, the frame 22 can carry other types of bins or containers than funnel-shaped hoppers. In an alternative embodiment, the frame 22 can carry a single receptacle with one or more partition wall(s) which divide(s) the receptacle into two or more bins or hoppers or compartments. In a non-limitative embodiment (not shown), at least one of the partition wall(s) extends laterally, i.e. substantially perpendicular to the longitudinal axis 23 of the frame 22, and divides the receptacle into a front bin and a sequentially disposed rear bin.

One skilled in the art will appreciate that the spreader assembly 26 can include more than two hoppers, bins or compartments. For instance and without being limitative, the spreader assembly can include two front hoppers, placed side-by-side, and two rear hoppers also placed side-by-side. In another non-limitative embodiment (not shown), the spreader assembly can include two front hoppers, placed side-by-side, and one rear hopper or vice-versa or any combination thereof.

Figure 3:
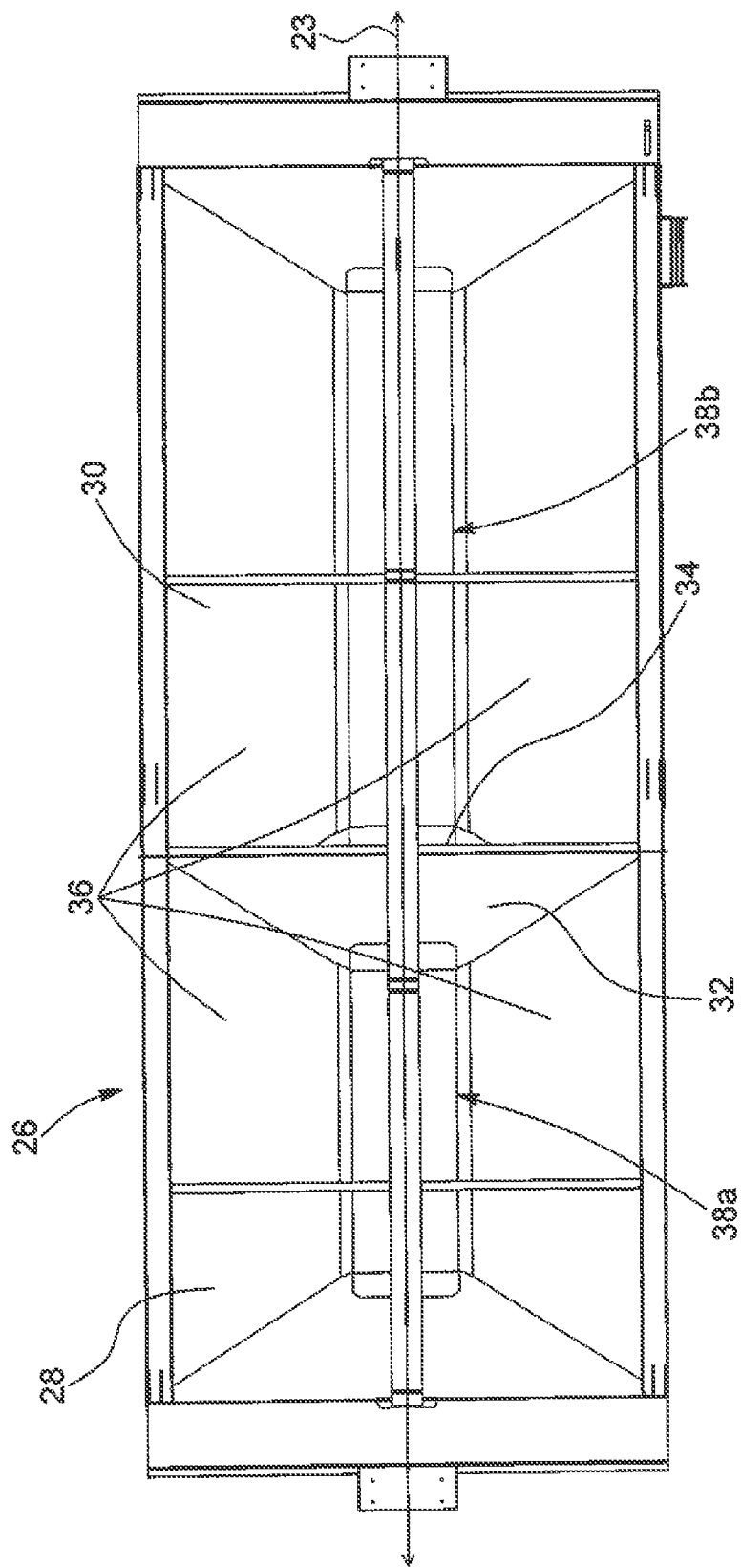
FIG. 3 is a top plan view of the spreader assembly shown in FIG. 1.

Referring now to FIGS. 2 and 3, there is shown that the spreader assembly 26 includes two hopper conveyors 38a, 38b and, more particularly, endless conveyors are mounted in the bottom of each one of the hoppers 28, 30 for conveying and discharging the materials from the hoppers 28, 30. In the embodiment shown, the hopper conveyor 38 is a chain conveyor. However, one skilled in the art will appreciate that other types of conveyors, conveying machines or movement imparting assemblies such as and without being limitative belt conveyors, screw conveyors, vibrating conveyors or pneumatic conveyors can be used. Thus, any suitable type of movement imparting assemblies capable of conveying granular materials can be used.

The hopper conveyors 38 are oriented substantially parallel to the longitudinal axis 23 of the frame 22. The conveyors 38 advance the materials lengthwise in opposed directions. The conveyor 38a of the front hopper 28 propels the material contained in the front hopper 28 rearwardly while the conveyor 38b of the rear hopper 30 propels the material contained in the rear hopper 30 forwardly. The discharge ends 39 of both conveyors 38 are close to one another, as it will be described in more details below. More particularly, the discharge ends 39 of both conveyors 38 are adjacent.

One skilled in the art will appreciate that each one of the hoppers 28, can include more than one hopper conveyor 38. For instance and without being limitative, the front hopper 28 can include two hopper conveyors or movement imparting assemblies to convey longitudinally and rearwardly the granular materials contained therein.

Figure 5:
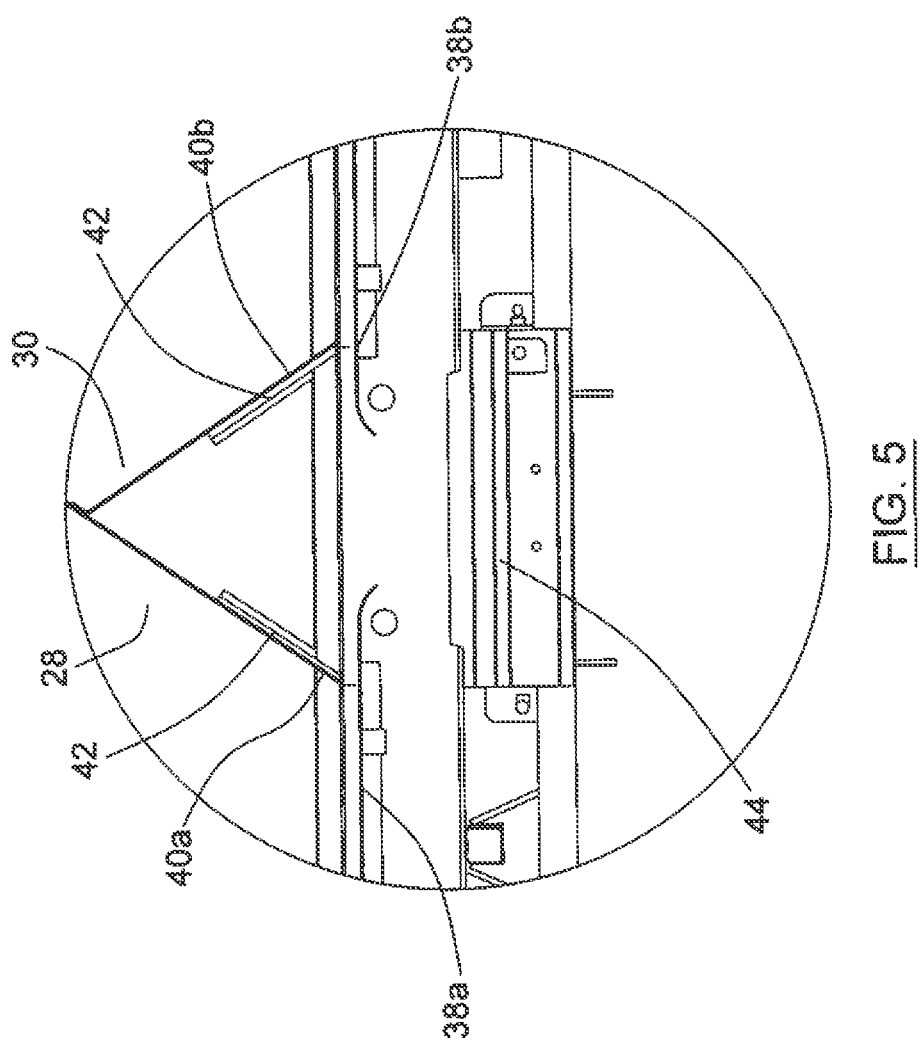
FIG. 5 is an enlarged view of detail A of FIG. 2.

As shown in FIG. 5, content of the hoppers 28, 30 is discharged through discharge openings 40a, 40b provided in the lower sections of the end walls 32, 34. For the front hopper 28, the discharge opening 40a is defined in the lower section of the rear end wall 32 while, for the rear hopper 30, the discharge opening 40b is defined in the lower section of the front end wall 34. Thus, the discharge openings 40a, 40b are substantially aligned with the hopper conveyors 38a, 38b in a manner such that the hopper conveyors 38a, 38b extend through their respective discharge openings 40a, 40b and granular materials flow outwardly of the hoppers 28, 30 through their respective discharge openings 40a, 40b on their respective conveyors 38a, 38b and are carried towards the discharge ends 39 of the hopper conveyors 38a, 38b. In the embodiment shown, the conveyors 38a, 38b extend outwardly of the hoppers 28, 30, through the discharge openings 40a, 40b, and their discharge ends 39 are located outwardly of the hoppers 28, 30.

One skilled in the art will appreciate that each one of the hoppers 28, can include more than one discharge opening 40a, 40b and at least one conveyor or movement imparting assembly can be associated with each one of the discharge openings 40a, 40b.

An adjustable gate 42 such as and without being limitative sliding and pivotal doors can be mounted to the hoppers 28, 30, adjacent to the openings 40 a, 40b, and configurable in a closed configuration and a plurality of opened configurations for controlling the quantity of granular material discharged. Therefore, the configuration of the adjustable gate 42 can be modified to control the granular material flowrate.

In an alternative embodiment, the traveling speed of the hopper conveyors can also be varied to control the granular material flowrate. One skilled in the art will appreciate that the granular material flowrate can be controlled via solely the adjustable gate configuration, via solely the traveling speed of the hopper conveyors or via a combination of the adjustable gate configuration and the traveling speed of the hopper conveyors.

As shown in FIGS. 4 and 5, a discharge conveyor 44 is located at the junction of the two hopper conveyors 38a, 38b, between and below both adjacent ends (or proximal ends) 39 of the hoppers 28, 30 and the hopper conveyors 38a, 38b, and is mounted to receive the granular materials propelled by the hopper conveyors 38a, 38b. Thus, the discharge ends 39 of the hopper conveyors 38a, 38b are located above the discharge conveyor 44. The discharge conveyor 44 conveys the materials laterally, substantially perpendicular to the hopper conveyors 38. The materials first conveyed by both hopper conveyors 38a, 38b and then by the discharge conveyor 44 are discharged to a common chute 46 located at a discharge end of the discharge conveyor 44. The discharge end of the discharge conveyor 44 substantially corresponds to a lateral end of the frame 22.

The discharge conveyor 44 is mounted to the frame 22 forwardly of the rear wheels 24a. The discharge chute 46 is also located forwardly of the rear wheels 24a and is substantially aligned with one set of rear wheels 24a. The granular materials are thus spread forwardly of the rear wheels 24a and, when the vehicle carrying the spreader assembly 26 moves forward, pressure is applied on the spread granular materials by the rear wheels 24a. Therefore, the discharged materials provide enhanced traction for these rear wheels 24a. Furthermore, the rear wheels 24a are used to press the spread granular materials on the road snow or ice, if any, or ground.

In the above described embodiment, the spreader assembly 26 is mounted directly to the frame 22 of the self-propelled vehicle 20. In an alternative embodiment (not shown), the spreader assembly 26 can be mounted to the frame of a mobile trailer which is towable by a self-propelled vehicle.

The conveyors can be provided with upstanding ribs, crossbars, or flanges spacedly mounted thereon for aiding in discharge of materials.

One skilled in the art will appreciate that, in an alternative embodiment (not shown), the spreader assembly 26 can have one discharge conveyor for each one of the bin conveyors. Thus, the discharge conveyor(s) 44 can be conceived to receive granular materials from one or more bin/hopper conveyors 38. All the discharge conveyors being mounted substantially perpendicularly to the longitudinal axis 23 of the frame and configured to convey and discharge the granular materials laterally. The discharge conveyors can discharge granular material either on the same side of the frame 22 or on opposed sides of the frame 22.

In an alternative embodiment (not shown), each one of the hoppers (or bins) of the spreader assembly 26 can have more than one bin conveyor for discharging and conveying the granular materials towards the discharge conveyor. The bin conveyors can discharge the granular materials conveyed on the same discharge conveyor or on several different discharge conveyors.

One skilled in the art will appreciate that the hoppers can include identical, similar or different materials.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is as follows:

1. A spreader assembly comprising:
   a frame with a longitudinal axis;
   at least two bins mounted to the frame, two of the at least two bins being disposed sequentially along the longitudinal axis and each including a bin movement imparting assembly, the movement imparting assemblies of the two bins being oriented substantially parallel to the longitudinal axis of the frame and configured to advance materials longitudinally and in opposed directions toward adjacent ends of the two bins; and
   at least one discharge movement imparting assembly mounted to the frame and being oriented substantially perpendicularly to the longitudinal axis of the frame and configured to receive the materials conveyed by at least one of the two bin movement imparting assemblies and advance laterally the materials.

2. A spreader as claimed in claim 1, wherein the at least two bins comprise funnel-shaped hoppers and the bin movement imparting assemblies are mounted to a bottom portion of the at least two funnel-shaped hoppers.

3. A spreader assembly as claimed in claim 1, wherein the at least two bins are mounted in an end-to-end relationship with a rear end of a front bin being adjacent to a front end of a rear bin.

4. A spreader assembly as claimed in claim 1, wherein the bin movement-imparting assemblies comprise bin conveyors and the at least one discharge movement imparting assembly comprises a discharge conveyor configured to receive the materials from the bin conveyors configured to advance materials longitudinally in opposed directions.

5. A spreader assembly as claimed in claim 4, wherein the discharge conveyor is located between and below adjacent ends of the bin conveyors.

6. A spreader assembly as claimed in claim 1, wherein the frame comprises at least one rear wheel; and the at least one discharge movement imparting assembly is mounted forwardly to the at least one rear wheel and comprises a discharge end substantially aligned laterally with at least one of the at least one rear wheel.

7. A spreader assembly as claimed in claim 6, wherein a portion of the materials discharged by the at least one discharge movement imparting assembly is pressed onto ground by the at least one rear wheel aligned laterally with the discharge end.

8. A spreader assembly as claimed in claim 1, wherein at least one of the at least two bins comprises a discharge opening through which a respective one of the bin movement imparting assemblies extends and the materials contained in the at least one of the bins are conveyed.

9. A self-propelled vehicle comprising the spreader assembly of claim 1.

10. A mobile trailer comprising a frame with a longitudinal axis, at least one rear wheel, and a spreader assembly mounted thereto, the spreader assembly comprising:
at least two bins mounted to the frame, disposed sequentially along the longitudinal axis and including a bin movement imparting assembly oriented substantially parallel to the longitudinal axis, the bin movement imparting assemblies of at least two of the sequentially disposed bins being configured to advance material contained in their respective bins longitudinally in opposed directions; and
at least one discharge movement imparting assembly mounted to the frame, forwardly to the at least one rear wheel, oriented substantially perpendicularly to the longitudinal axis and being configured to receive material conveyed by at least one of the movement imparting assemblies and advance the material laterally, the at least one discharge movement imparting assembly comprising a discharge end substantially aligned laterally with at least one of the at least one rear wheel and a portion of the materials discharged is pressed onto ground by the at least one rear wheel aligned laterally with the discharge end.

11. A mobile trailer as claimed in claim 10, wherein the bin movement imparting assemblies are mounted to a bottom portion of the bins and advance materials towards proximal ends of the at least two bins.

12. A mobile trailer as claimed in claim 10, wherein at least one of the bin movement imparting assemblies comprises a bin conveyor and the at least one discharge movement imparting assembly comprises a discharge conveyor and the discharge conveyor is configured to receive the materials from the at least two bin movement imparting assemblies configured to advance the material contained in the at least two bins longitudinally in opposed directions.

13. A mobile trailer as claimed in claim 12, wherein the discharge conveyor is located between and below proximal ends of the at least two bin movement imparting assemblies configured to advance the material contained in the at least two bins longitudinally in opposed directions.

14. A mobile trailer as claimed in claim 10, wherein at least one of the at least two bins comprises a discharge opening through which a respective one of the bin movement imparting assemblies extends and the materials contained in the at least one of the bins exit.

15. A mobile trailer as claimed in claim 10 wherein the frame is securable to a vehicle for being hauled thereby.

16. A self-propelled vehicle comprising:
a frame having a longitudinal axis;
at least two bins mounted to the frame and disposed sequentially along the longitudinal axis, at least two of the sequentially disposed bins including a bin conveyor oriented substantially parallel to the longitudinal axis of the frame, the bin conveyors being configured to advance materials lengthwise in opposed directions toward proximal ends of the bins; and
a discharge conveyor mounted to the frame, oriented substantially perpendicularly to the longitudinal axis of the frame and located close to adjacent ends of the bin conveyors and being configured to receive materials from the bin conveyors and to laterally convey the materials.

17. A self-propelled vehicle as claimed in claim 16, wherein the at least two bins have contiguous end walls and the bin conveyors are mounted to a bottom portion of the at least two bins.

18. A self-propelled vehicle as claimed in claim 16, wherein the discharge conveyor is located between and below the adjacent ends of the bin conveyors.

19. A self-propelled vehicle as claimed in claim 16, wherein the frame comprises at least one rear wheel and the at least one discharge conveyor is mounted forwardly to the at least one rear wheel and comprises a discharge end substantially aligned laterally with at least one of the at least one rear wheel and a portion of the materials discharged is pressed onto ground by at least one of the at least one rear wheel.

20. A self-propelled vehicle as claimed in claim 16, wherein at least one of the at least two bins comprises a discharge opening through which a respective one of the bin conveyor extends and the materials contained in the at least one of the bins are conveyed.

21. A method for spreading materials from a spreader assembly mounted to a frame and including two bins disposed sequentially along a longitudinal axis of the frame, the method comprising:
conveying rearwardly material contained in a front one of the bins;
conveying forwardly material contained in a rear one of the bins;
receiving the materials conveyed forwardly and rearwardly from the front one and the rear one of the bins;
conveying laterally the materials received; and
discharging, at a lateral end of the spreader assembly and forwardly of at least one rear wheel mounted to the frame, the materials conveyed laterally.

22. A method as claimed in claim 21, wherein the material contained in the front one of the bins is conveyed rearwardly on a front bin conveyor and the material contained in the rear one of the bins are conveyed forwardly on a rear bin conveyor.

23. A method as claimed in claim 21, wherein the materials are received on a discharge conveyor.

24. A spreader assembly comprising:
a frame with a longitudinal axis;
at least two bins mounted to the frame, two of the at least two bins being disposed sequentially along the longitudinal axis and each including a bin movement imparting assembly, the movement imparting assemblies of the two bins being configured to advance materials longitudinally and in opposed directions toward adjacent ends of the two bins; and
at least one discharge movement imparting assembly mounted to the frame and configured to receive the materials conveyed by at least one of the two bin movement imparting assemblies and advance laterally the materials.

25. The spreader assembly as claimed in claim 24, wherein the frame comprises at least one rear wheel; and the at least one discharge movement imparting assembly is mounted forwardly to the at least one rear wheel and comprises a discharge end substantially aligned laterally with at least one of the at least one rear wheel.

26. A spreader assembly as claimed in claim 25, wherein a portion of the materials discharged by the at least one discharge movement imparting assembly is pressed onto ground by the at least one rear wheel aligned laterally with the discharge end.

\* \* \* \* \*